United States Patent [19]
Yasuda

[11] Patent Number: 6,092,031
[45] Date of Patent: *Jul. 18, 2000

[54] ALIGNMENT CORRECTION METHOD AND SEMICONDUCTOR DEVICE

[75] Inventor: Tsuneo Yasuda, Tokyo, Japan

[73] Assignee: Mitsubishi Denki Kabushiki Kaisha, Tokyo, Japan

[21] Appl. No.: 08/862,291

[22] Filed: May 22, 1997

[30] Foreign Application Priority Data

Jan. 6, 1997 [JP] Japan ..................................... 9-000151

[51] Int. Cl.[7] .................................................. G01B 21/00
[52] U.S. Cl. .............................. 702/94; 702/85; 702/182; 364/468.28
[58] Field of Search .................................. 702/94, 182, 85; 364/468.24, 468.28, 488–491, 578; 430/22, 30; 250/491.1, 492.2, 559.3; 355/53

[56] References Cited

U.S. PATENT DOCUMENTS

| | | | |
|---|---|---|---|
| 4,418,467 | 12/1983 | Iwai | 250/491.1 |
| 4,843,563 | 6/1989 | Takahashi et al. | |
| 5,249,016 | 9/1993 | Tanaka | 355/53 |
| 5,375,061 | 12/1994 | Hara et al. | 364/468.28 |
| 5,442,561 | 8/1995 | Yoshizawa et al. | 364/468.06 |
| 5,468,580 | 11/1995 | Tanaka | 430/22 |
| 5,656,402 | 8/1997 | Kasuga | 430/22 |
| 5,695,897 | 12/1997 | Mitome et al. | 430/22 |

FOREIGN PATENT DOCUMENTS

| | | |
|---|---|---|
| 61-251024 | 11/1986 | Japan. |
| 2-297011 | 12/1990 | Japan. |
| 4 305913 | 10/1992 | Japan. |

*Primary Examiner*—Marc S. Hoff
*Assistant Examiner*—Bryan Bui
*Attorney, Agent, or Firm*—Oblon, Spivak, McClelland, Maier & Neustadt, P.C.

[57] ABSTRACT

An alignment correction method which can obtain proper correction values and a semiconductor device fabricated through this alignment method are obtained. An alignment correction part (6a) calculates a stepper correction value which is set in a stepper (4a) in next alignment from trends of true shift amounts obtained from a plurality of types of processes. The true shift amount, which is the difference between stepper correction value set in the stepper and overlay check correction values detected by overlay checking devices, is actual shift amount upon alignment. The number of the true shift amounts obtained from the plurality of types of processes is larger than that of true shift amounts obtained from a single process. Thus, a trend of the true shift amounts is proper, whereby a correction value set in the stepper for the next alignment becomes proper.

7 Claims, 12 Drawing Sheets

| DATE | 7/30 | 8/3 | 8/7 | 8/8 | 8/10 |
|---|---|---|---|---|---|
| LOT NUMBER | L 4 | L 1 | L 1 | L 2 | L 3 |
| STEP CODE | C | A | A | A | B |
| STEPPER CODE | 4 b | 4 a | 4 a | 4 a | 4 a |

| CAUSE | CODE | COUNT NUMBER |
|---|---|---|
| LOT ABNORMALITY | L 1 | 2 |
| PROCESS ABNORMALITY | A | 3 |
| STEPPER ABNORMALITY | 4 a | 4 |

ALIGNMENT CORRECTION METHOD AND SEMICONDUCTOR DEVICE

BACKGROUND OF THE INVENTION

1. Field of the Invention

The present invention relates to an alignment correction method of adjusting plane-directional relative positions of a plurality of patterns which are formed in fabrication of semiconductor devices, and a semiconductor device fabricated through the alignment method.

2. Description of the Background Art

Alignment is described in detail with reference to a conceptual diagram shown in FIG. 13. Planes 3a and 3b include patterns 1a and alignment marks 2a to 2d and patterns 1b and alignment marks 2e to 2h respectively. The patterns 1a and 1b, which are formed on wafers respectively, are made of a silicon compound, a metal or the like. The alignment marks 2a to 2d are formed simultaneously with the patterns 1a, while the alignment marks 2e to 2h are formed simultaneously with the patterns 1b. In a process of fabricating semiconductor devices, the patterns 1a must be stacked on correct positions on the patterns 1b. The alignment is adapted to relatively align the positions of such patterns with each other. Among processes of fabricating semiconductor devices, an exposure process requires such alignment. In the exposure process, reticles are aligned with wafers in practice.

FIG. 14 is a block diagram showing a conventional production management system for managing fabrication of semiconductor devices. Numerals 4a, 4b, . . . denote stepping projection aligners (hereinafter referred to as steppers) employed in the aforementioned exposure process, numerals 5a, 5b, . . . denote overlay checking devices, numeral 6 denotes a production management system body, numeral 61a denotes an alignment correction part, numeral 6b denotes a data base, numerals 7, . . . denote semiconductor fabrication devices such as sputtering devices or etching devices, and numeral 8 denotes a reference terminal for referring to the contents of the data base 6b.

A shift amount is caused between patterns which are aligned with each other by the steppers despite the alignment, due to various causes such as mechanical errors of the steppers 4a, 4b, . . . themselves and the like.

A correction value (hereinafter referred to as stepper correction value) for eliminating such shift amount is set in the steppers. On the other hand, the overlay checking device detects the shift amount and calculate correction value (hereinafter referred to as overlay check correction value) for eliminating the shift amount.

The production management system body 6 manages data (alignment data) related to the alignment, i.e., the overlay check correction value, the stepper correction values, wafer types such as lot numbers, product numbers and the like, the date of the alignment, contents of processing, the production history and the like. The alignment data are stored in the data base 6b.

The alignment correction part 61a, which is a function of the production management system body 6, calculates the stepper correction values.

A conventional alignment correction method which is carried out by the production management system shown in FIG. 14 is now described with reference to a flow chart shown in FIG. 15. First, the production management system body 6 sets the stepper correction value (step 901). Then, the exposure process is carried out, while the stepper 4a performs alignment (step 902). Then, the overlay checking device 5a detects a shift amount between alignment marks (step 903). Then, the overlay checking device 5a calculates overlay correction value from the detected shift amount (step 904). Then, the alignment correction part 61a calculates a stepper correction value to be set in next alignment from the overlay check correction value calculated at the step 904 and the alignment data managed by the production management system body 6 (step 905). Then, the production management system body 6 adds the alignment data related to the steps 901 to 904 to the data base 6b and manages the same (step 906). This also applies to the remaining steppers 4b, . . . and the remaining overlay checking devices 5b, . .

A method of forming the stepper correction value set by the alignment correction part 61a in the steppers 4a, 4b, . . . is now described. First, a true shift amount is defined. The true shift amount is expressed as follows:

true shift amount=stepper correction value−overlay check correction value . . . (equation 1)

The stepper correction value and the overlay check correction value appearing on the right side of the equation 1 are those set in each stepper and calculated by each overlay checking device 5 at the steps 901 and 905 in FIG. 15 respectively. Namely, the true shift amount is actual shift amount resulting from alignment performed by the steppers 4a, 4b, . . . This is now described in detail with reference to a one-directional shift amount in alignment offsets x and y illustrated in FIG. 16. As shown in FIG. 16, it is assumed that a stepper correction value for correcting a shift amount of +1 is set, and a overlay check correction value for correcting a shift amount of −1 results after alignment. The difference of +2 between the stepper correction value and the overlay check correction value is the true shift amount. Assuming that a true shift amount of +2 results also after next alignment, therefore, it comes to that a overlay check correction value is zero, i.e., no shift amount is caused when the true shift amount of +2 is set as a stepper correction value for the next alignment.

In practice, however, true shift amounts are not necessarily regularly constant, due to various causes such as mechanical errors of the steppers 4a, 4b, . . . themselves. Therefore, it is necessary to predict true shift amount resulting after the next alignment. The alignment correction part 61a performs this prediction.

A method of predicting true shift amounts carried out by the alignment correction part 61a is now described. The production management system carries out various processes for fabricating semiconductor devices with the steppers 4a, 4b, . . . and the semiconductor fabrication devices 7, . . . Every time alignment is performed through the steppers 4a, 4b, . . . the production management system body 6 stores alignment data in the data base 6b and manages the same. The alignment data include true shift amounts, which are the differences between stepper correction values and overlay check correction values. Among the true shift amounts stored in the data base 6b, those satisfying conditions (alignment conditions) for the next alignment are extracted. The conditions for the next alignment are as follows: An exposure processing time is within a specific range from the next alignment, and wafer type, process code, and stepper code of stepper employed for forming upper and lower layer patterns respectively are identical to those for the next alignment. The aforementioned specific range is previously set by an operator. Assuming that the pattern 1a shown in FIG. 13 is upper layer pattern formed in the next alignment, the previously formed pattern 1b corresponds to lower layer pattern, for example.

FIG. 18 is a graph showing trend (fluctuations with respect to processing times) of the extracted true shift amounts. Referring to FIG. 18, the horizontal axis shows dates of alignment. Each recording point shown in this graph satisfying the aforementioned alignment conditions is recorded every time patterns on each wafer are changed, i.e., every alignment. This is because the shift amounts as well as the correction values are changed if the patterns are changed, due to influences on optical measurement for the alignment.

The alignment correction part 61a predicts true shift amount in the next alignment (date tx) from this trend. This trend is employed since the true shift amounts in the next alignment can be correctly predicted by employing the trends in the same alignment conditions as those for the next alignment.

The alignment correction part 61a predicts an average value of recent three recording points P1, P2 and P3 as a true shift amount in the next alignment, as shown in FIG. 18. Further, the alignment correction part 61a forms the predicted true shift amount as a stepper correction value which is set in the stepper 4a in the next alignment.

Thus, the method of predicting true shift amount carried out by the alignment correction part 61a is adapted to calculate stepper correction value which is set in the steppers in the next alignment only from the trends of the true shift amounts related to the same alignment conditions as those for the next alignment.

The conventional alignment correction method of the aforementioned structure has the following problems (1) to (3): (1) Referring to FIG. 18, influence by fluctuation of the trend is relatively small if the time between a date t1 of precedent alignment and the date tx is relatively short, while the influences may be so increased that the stepper correction values set in the next alignment may be improper if the time is relatively long. (2) FIG. 19 is a graph showing exemplary trends of correction values with respect to dates. The true shift amounts are predicted since the same are not necessarily regularly constant, as described above. As shown in FIG. 19, however, true shift amount which is the difference between stepper correction value D1 and overlay check correction value D2 may be substantially constant. If the true shift amounts are constant, it means that shift amounts result by fluctuations of the overlay check correction values. If the true shift amounts are substantially constant, therefore, the stepper correction values may be improper. (3) If shift amount detected by any overlay checking device 5 is out of a determined standard range (hereinafter referred to as nonstandardization), the cause for the nonstandardization cannot be determined.

SUMMARY OF THE INVENTION

According to a first aspect of the present invention, an alignment correction method, in a semiconductor device production management system including a plurality of steppers to be set with a stepper correction value for eliminating a shift amount between patterns which are stacked on semiconductor devices and a overlay checking device for detecting the shift amount between the patterns and forming an overlay check correction value for eliminating the detected shift amount as objects of management, for forming the stepper correction value which is set by the production management system in the steppers, includes a step (a) of storing true shift amounts which are the difference between the stepper correction value and the overlay check correction value by the production management system every time alignment is performed in the steppers, and a step (b) of forming a stepper correction value which is set in a specific stepper in next alignment from trends of first true shift amounts related to the specific stepper among the stored true shift amounts by the production management system.

According to a second aspect of the present invention, the step (b) includes (b-1) a step of obtaining a trend of second true shift amounts related to a process which is identical to a process for carrying out the next alignment among the first true shift amounts and predicting a true shift amount in the next alignment from the trend of the second true shift amounts, and (b-2) a step of correcting the predicted true shift amount through third true shift amounts other than the second true shift amounts among the first true shift amounts, thereby forming the stepper correction value which is set in the specific stepper in the next alignment.

According to a third aspect of the present invention, the step (b-1) includes a step of regarding an average value of the trend of the second true shift amounts as a predicted value of a true shift amount in the next alignment, and the step (b-2) includes a step of regarding a value which is obtained by adding an average value of displacements of the third true shift amounts to the predicted value as the stepper correction value which is set in the specific stepper in the next alignment.

According to a fourth aspect of the present invention, the alignment correction method further includes (c) a step of determining whether or not the trend of the second true shift amounts is substantially constant by the production management system, and (d) a step of forming other stepper correction value by the production management system on the assumption that the shift amount is not caused if the trend of the second true shift amounts is determined as being substantially constant in the step (c).

According to a fifth aspect of the present invention, the alignment correction method further includes (c) a step of determining whether or not the shift amount detected by the overlay checking device is nonstandard by the production management system, and (d) a step of storing and outputting alignment conditions causing the shift amount by the production management system if the shift amount is determined as being nonstandard in the step (c).

According to a sixth aspect of the present invention, the alignment correction method further includes (c) a step of determining whether or not a wafer which is processed in the next alignment causes nonstandard shift amount by the production management system, and the step (b) is adapted to form the stepper correction value by employing only a true shift amount of the alignment processing a wafer of the same lot as that of the wafer among the true shift amounts if the wafer is determined as causing the nonstandard shift amount in the step (c).

According to a seventh aspect of the present invention, the alignment correction method further includes (c) a step of determining whether or not stepper employed in the next alignment causes nonstandard shift amount by the production management system, and (d) a step of outputting such information that the specific stepper is abnormal when the stepper is determined as causing the nonstandard shift amount in the step (c).

According to an eighth aspect of the present invention, a semiconductor device has stacked patterns, which are aligned with each other by steppers to be set with a stepper correction value formed by an alignment correction method, in a semiconductor device production management system including a plurality of steppers to be set with the stepper correction value for eliminating a shift amount between the patterns and an overlay checking device for detecting the shift amount between the patterns and forming an overlay check correction value for eliminating the detected shift amounts as objects of management, for forming the stepper correction value set by the production management system in the steppers, including (a) a step of storing a true shift amount which is the difference between the stepper correction values and the overlay check correction value by the production management system every time alignment is performed in the steppers, and (b) a step of forming a stepper correction value which is set in a specific stepper in next alignment from trends of first true shift amounts related to the specific stepper among the stored true shift amounts by the production management system.

According to the first aspect of the present invention, the number of the first true shift amounts related to the same stepper as that employed for the next alignment is large among the stored true shift amounts, and the trend of the first true shift amounts is proper, whereby such an effect is attained that proper stepper correction values are obtained.

According to the second aspect of the present invention, such an effect is attained that a proper stepper correction value can be obtained by correcting the predicted true shift amount with the third true shift amounts related to a process which is different from that for performing the next alignment.

According to the third aspect of the present invention, such an effect is attained that the predicted value can be readily corrected by adding the average value of displacements to the predicted value (the average value of the second true shift amounts) which is the predicted true shift amount.

According to the fourth aspect of the present invention, such an effect is attained that a proper stepper correction value can be obtained even if the second true shift amounts are constant while the stepper correction values fluctuate.

According to the fifth aspect of the present invention, such an effect is attained that the cause for nonstandardization can be automatically detected.

According to the sixth aspect of the present invention, only true shift amounts corresponding to alignment processing a wafer of the same lot as that processed in the next alignment are employed among a plurality of true shift amounts and only true shift amounts corresponding to the alignment processing the same wafer as the lot are employed among the plurality of true shift amounts only when the wafer processed in the next alignment causes nonstandardization while true shift amounts other than those corresponding to the alignment processing the same wafer as the lot are employed among a plurality of true shift amounts in a contrary case, i.e., when the wafer processed in the next alignment is other than a wafer causing nonstandardization, whereby true shift amounts formed in both cases are at proper values, and such an effect is attained that alignment accuracy is further increased.

According to the seventh aspect of the present invention, such an effect is attained that occurrence of nonstandardization can be previously prevented.

According to the eighth aspect of the present invention, such an effect is attained that the semiconductor device fabricated through the inventive alignment correction method has higher reliability than the prior art due to high accuracy of pattern alignment.

An object of the present invention is to obtain an alignment correction method which can obtain proper stepper correction values while determining the cause for nonstandardization, and a semiconductor device fabricated through the alignment method.

The foregoing and other objects, features, aspects and advantages of the present invention will become more apparent from the following detailed description of the present invention when taken conjunction with the accompanying drawings.

BRIEF DESCRIPTION OF THE DRAWINGS

FIG. 15 is a flow chart showing an alignment correction method;

FIG. 16 is a conceptual diagram showing an exemplary relation between a stepper correction value, a overlay check correction value and a true shift amount;

FIG. 17 is a conceptual diagram showing an exemplary relation between a stepper correction value, a overlay check correction value and a true shift amount;

FIG. 18 is a graph illustrating shift amounts retrieved under the same alignment conditions by a trend of dates of detection and true shift amounts; and FIG. 19 is a graph showing exemplary trends of correction values with respect to dates.

DESCRIPTION OF THE PREFERRED EMBODIMENTS

Embodiment 1

Figure 1:
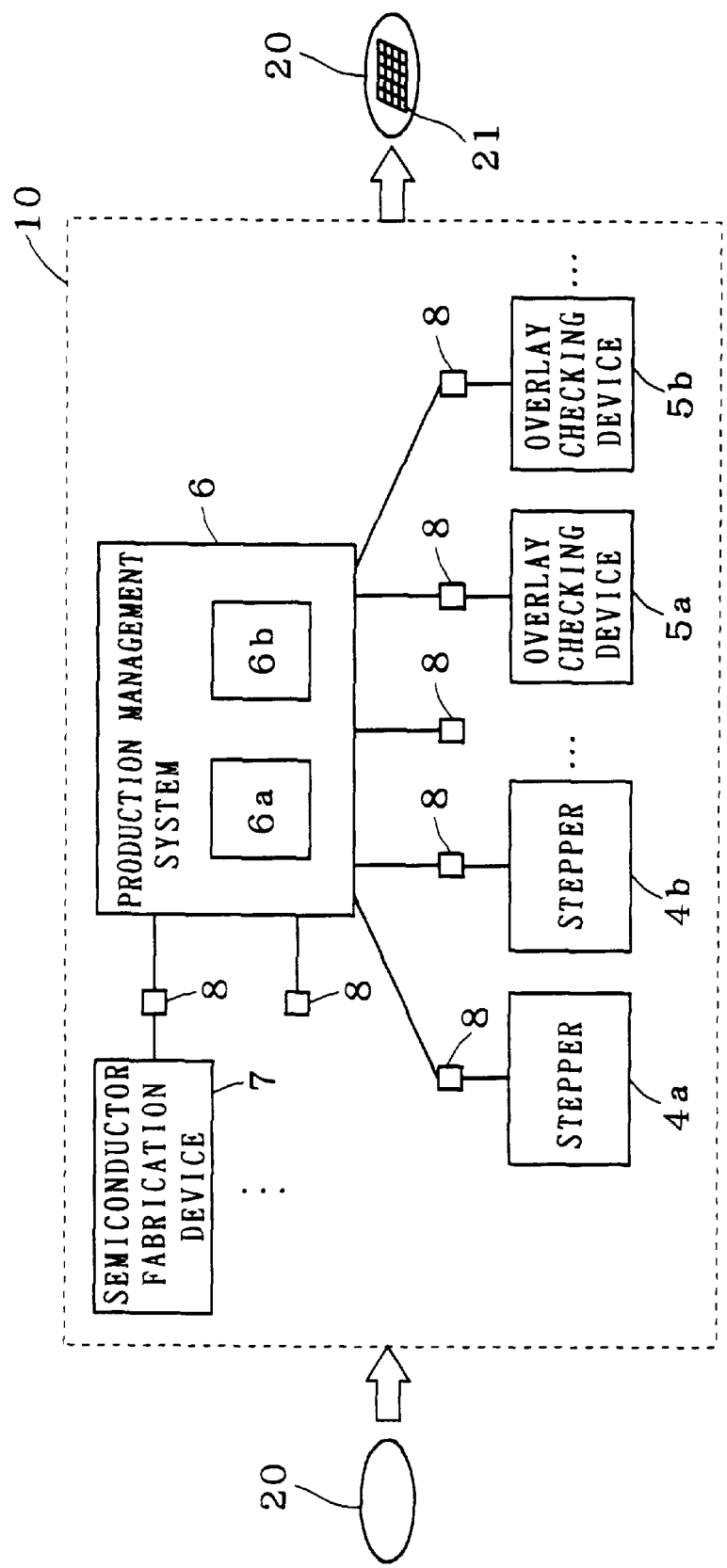
FIG. 1 is a block diagram showing the structure of a production management system in the present invention.

FIG. 1 is a block diagram showing a production management system for managing fabrication of semiconductor devices according to the present invention. Numerals 4a, 4b, . . . denote stepping projection aligners (hereinafter referred to as steppers) employed in the aforementioned exposure process, numerals 5a, 5b, . . . denote overlay checking devices, numeral 6 denotes a production management system body, numeral 6a denotes an alignment correction part included in the production management system, numeral 6b denotes a data base, numerals 7, . . . denote semiconductor fabrication devices such as sputtering devices or etching devices, numeral 8 denotes a reference terminal for referring to the contents of the data base 6b, numeral 10 denotes a fabrication line for fabricating semiconductor devices (integrated circuits), numeral 20 denotes a wafer (bare wafer) fed to the fabrication line 10, and numeral 21 denotes semiconductor devices formed by the fabrication line 10 on another wafer 20.

Stepper correction values are set in the steppers 4a, 4b, . . . On the other hand, the overlay checking devices 5a, 5b, . . . calculate overlay check correction values. As shown in FIG. 1, the production management system includes the steppers 4a, 4b, . . . and the overlay checking devices 5a, 5b, . . . as objects of management.

The production management system body 6 manages data (alignment data) related to alignment, i.e., the overlay check correction values, the stepper correction values, wafer lot numbers (product numbers), dates of alignment, contents of processing, production history and the like. The data base 6b stores the alignment data.

The alignment correction part 6a, which is a function of the production management system body 6, calculates the stepper correction values.

An alignment correction method in the embodiment 1 of the present invention performed by the production management system shown in FIG. 1 is now described with reference to a flow chart shown in FIG. 2. First, a step 101 is described. The production management system carries out various processes for fabricating semiconductor devices with the steppers 4a, 4b, . . . and the semiconductor fabrication devices 7. Every time alignment is performed through the steppers 4a, 4b, . . . , the production management system body 6 stores alignment data in the data base 6b and manages the same. The alignment data include a true shift amount which is the difference between the stepper correction value and the overlay check correction value. The various processes include those carried out on wafers having different lot numbers, those having different processing contents and the like, for example. The processing contents indicate which pattern is formed among stacked patterns. Thus, processes having different processing contents are treated as different processes.

Figure 2:
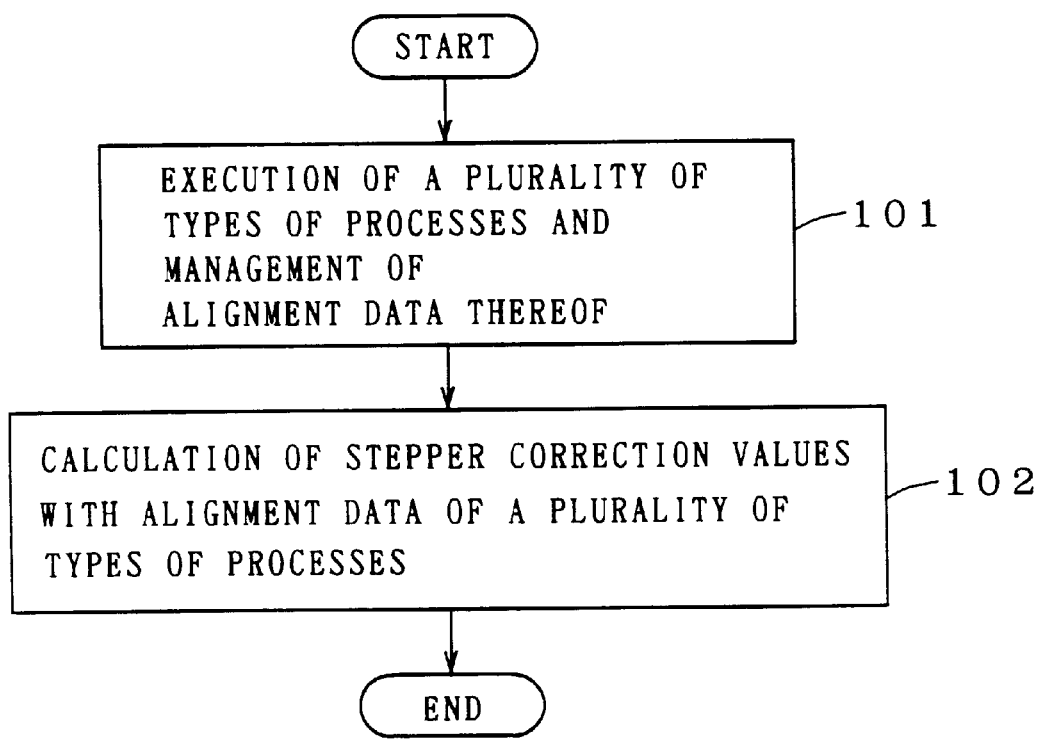
FIG. 2 is a flow chart showing an alignment correction method according to an embodiment 1 of the present invention.

A step S102 shown in FIG. 2 is now described. Among the true shift amounts stored in the data base 6b, those satisfying an alignment condition in next alignment are extracted as first true shift amounts. The alignment condition is only that the stepper is preferably identical to that employed in the next alignment, dissimilarly to the prior art. Therefore, the number of the extracted true shift amounts is increased as compared with the prior art. Alternatively, the alignment condition may be that the stepper is identical to that employed in the next alignment and that the type of a product is identical to each other.

Figure 3:
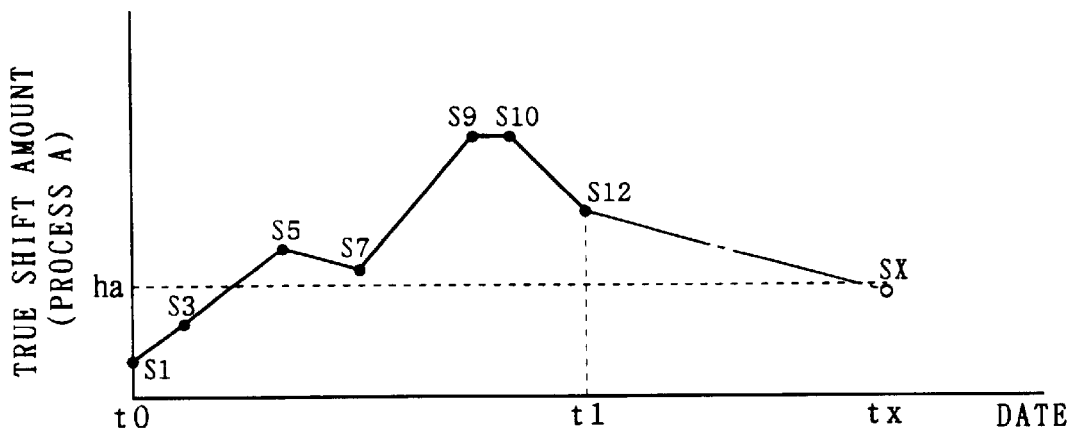
FIG. 3 is a graph showing an exemplary trend of dates of detection of shift amounts and true shift amounts in a process A.
Figure 4:
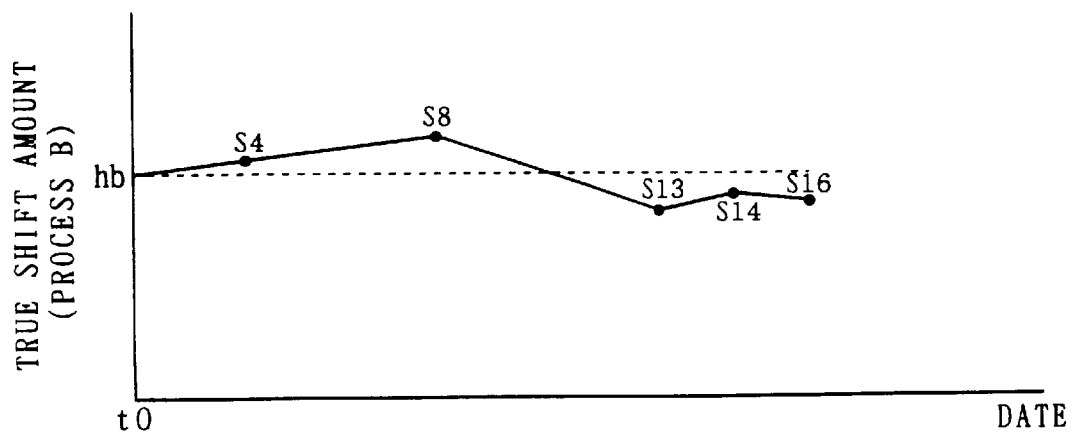
FIG. 4 is a graph showing an exemplary trend of dates of detection of shift amounts and true shift amounts in a process B.
Figure 5:
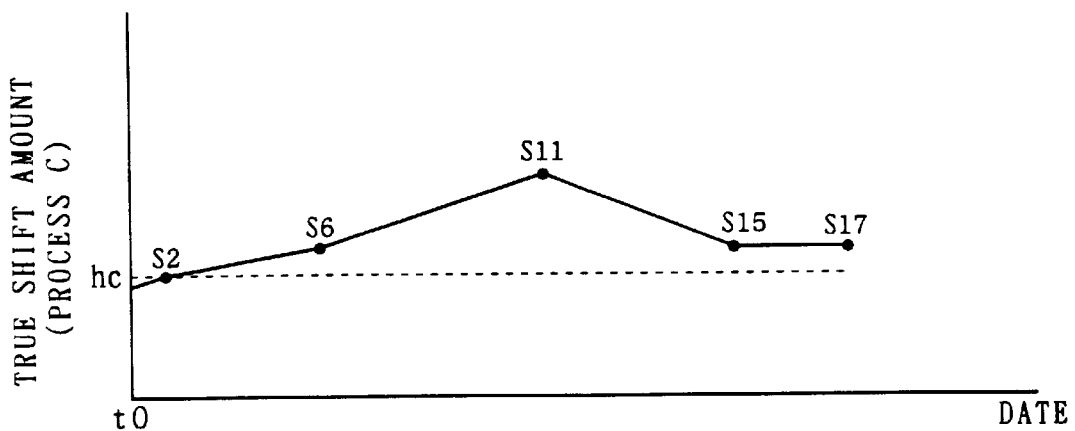
FIG. 5 is a graph showing an exemplary trend of dates of detection of shift amounts and true shift amounts in a process C.

Further, the extracted true shift amounts are separated so that trends thereof are obtained, similarly to the prior art. FIGS. 3, 4 and 5 are graphs showing exemplary trends of true shift amounts (second true shift amounts) related to identical processes. FIGS. 3, 4 and 5 show processes A, B and C, which are exposure processes having different processing contents. The horizontal axes of these graphs show dates of alignment. Recording points before a date t0 are omitted in these graphs. In practice, not only the processes A, B and C but hundreds of processes are included.

The alignment correction part 6a predicts a true shift amount in the next alignment from average value of the trend of the same process as that in the next alignment among the processes A, B and C. If the next alignment is carried out in the process A, for example, the alignment correction part 6a predicts a true shift amount in the next alignment from average value ha of true shift amounts as a predicted value, as shown in FIG. 3.

If the time between dates 1t and 1x shown in FIG. 3 is long, influence by the fluctuation of the trend is increased. If the time between the dates t1 and tx is long, therefore, it is preferable to correct the predicted true shift amount. Preferably, the alignment correction part 6a determines whether or not the time between the dates t1 and tx is long, by determining whether or not the time is longer than a value previously set by an operator. If particularly necessary, however, the operator may alternatively determine whether or not the time between the dates t1 and tx is long. If the time between the dates t1 and tx is short as a result of this determination, the predicted true shift amount is not corrected. If the true shift amount is not corrected, this is similar to the conventional alignment correction method.

Figure 6:
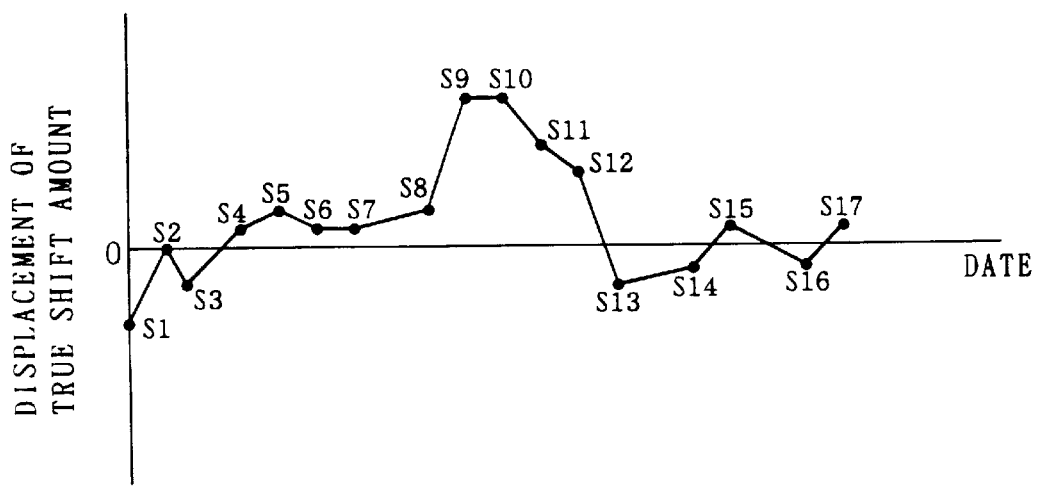
FIG. 6 is a graph showing a trend of dates of detection of shift amounts and displacements of true shift amounts.

On the other hand, the predicted true shift amounts are corrected as follows: FIG. 6 is a graph showing trend of displacements of true shift amounts. Symbols in FIG. 6 correspond to those in FIGS. 3 to 5. Referring to FIG. 6, the horizontal axis shows dates of alignment. The displacement of each true shift amount is obtained by subtracting the average value of the true shift amounts from this shift amount. For example, the displacement of the true shift amount at a recording point S1 shown in FIG. 6 is obtained by subtracting the average value ha from the true shift amount at the recording point S1 in FIG. 3. This also applies to the displacements of the true shift amounts of the remaining recording points S2 to S17. The alignment correction part 6a calculates the average value of recent displacements among those of the true shift amounts (third true shift amounts). The correction part 6a corrects the predicted true shift amount by adding this average value to the predicted true shift amount, for regarding the corrected true shift amount as the stepper correction value set in the stepper in the next alignment.

Thus, the stepper correction value set in the stepper in the next alignment are expressed as follows:

stepper correction value=average value of true shift amounts+average value of displacements . . .    (equation 2)

When the next alignment is performed in the process A, for example, the average values of the true shift amounts and the displacements on the right side of the equation 2 are the average value ha shown in FIG. 3 and the average value of the true shift amounts at the recording points S15, S16 and S17 shown in FIG. 6 respectively.

The average values of the true shift amounts and the displacements are obtained by averaging those of a plurality of recent recording points, the number of which is previously set by the operator.

Effects of this embodiment are as follows: First, the alignment condition is only that the stepper is identical to that for the next time and the number of extracted true shift amounts is increased as compared with the prior art, whereby proper stepper correction value can be obtained even if the time between the dates t1 and tx is long. The next true shift amount is predicted similarly to the prior art, and if the time between the dates t1 and tx is long, proper stepper correction value can be obtained every process by correcting the predicted true shift amount through the true shift amounts of the remaining processes. Further, the predicted true shift amount can be readily corrected by adding the average value of displacements to the predicted true shift amount (the average value of the true shift amounts).

Embodiment 2

An alignment correction method according to an embodiment 2 of the present invention performed by the production management system shown in FIG. 1 is described with reference to a flow chart shown in FIG. 7. At a step 201, the alignment correction part 6a determines whether or not a trend of true shift amounts which are the differences between stepper correction values and overlay check correction values is substantially constant and whether or not trends of the stepper correction values (or the overlay check correction values) fluctuate. The processing advances to a step 202 if the trend of true shift amounts is substantially constant, otherwise the processing advances to a step 203. At the step 203, the alignment correction part 6a calculates a stepper correction value similarly to the embodiment 1.

At the step 202, on the other hand, the alignment correction part 6a calculates stepper a correction value which are set in the steppers in next alignment on the assumption that no shift amounts have been detected. The reason for this is as follows: The true shift amounts are not necessarily regularly constant in practice as described with reference to the prior art, and hence a true shift amount caused after the next alignment are predicted. If the true shift amount is predicted as described in relation to the embodiment 1 or the prior art when the true shift amounts are substantially constant, however, no proper stepper correction value can be obtained. If the true shift amount is predicted as described in relation to the embodiment 1 or the prior art when the true shift amounts are substantially constant, the stepper correction value fluctuates depending on the overlay check correction value, and hence the shift amount also fluctuates. If the true shift amounts are substantially constant, therefore, prediction is made on the assumption that no shift amount have been detected. The stepper correction value set in the steppers in the next alignment by this prediction is that set in the stepper in preceding alignment, or the average value of the substantially constant true shift amounts. Preferably the latter.

Consider that the next alignment is performed in a certain process among processes A, B, C, . . . , for example. It is assumed that recent trends of stepper correction values D1 and overlay check correction values D2 in this process are as shown in FIG. 19. If the difference between maximum and minimum true shift amounts among true shift amounts (the differences between the stepper correction values D1 and the overlay check correction values D2) of a recent constant number m (3 in this case) of recording points (times t2, t3 and t4) shown in FIG. 19 is within a constant margin a1 and the stepper correction values D1 at the aforementioned three times are different from each other, the processing advances to the step 202. The values of the constant number m and the constant margin a1 are previously set by the operator. If the processing advances to the step 202, the alignment correction part 6a sets the average value of true shift amounts at the aforementioned three times as the stepper correction value in the stepper employed for the next alignment (date tx in FIG. 19).

Thus, when the trend of the true shift amounts is substantially constant, other stepper correction value, i.e., those on the assumption that the shift amount is not caused, are calculated, to be set in the steppers.

An effect of this embodiment is as follows: When recent true shift amounts are substantially constant, proper stepper correction value can be obtained by calculating the stepper correction value on the assumption that the shift amount is not caused.

Embodiment 3

In an embodiment 3 of the present invention, a function capable of determining the cause for nonstandard shift amounts is provided on the embodiment 1 or 2. FIG. 8 is a table showing parts of alignment data of alignment causing nonstandardization among those stored in the data base 6b shown in FIG. 1. Referring to FIG. 8, dates are those causing nonstandardization, and may include times. The alignment correction part 6a determines whether or not the shift amount being detected by the overlay checking device is nonstandard from overlay check correction value and standard value which is set specifically to the stepper. The standard values are previously stored in the data base 6b.

An alignment correction method according to the embodiment 3 of the present invention performed by the production management system shown in FIG. 1 is described with reference to a flow chart shown in FIG. 9. At a step 301, the alignment correction part 6a reads the alignment data stored in the data base 6b in order of dates. At a step 302, the alignment correction part 6a determines whether or not alignment data existing in a past constant period from next alignment are present. The processing advances to a step 303 if such alignment data are present, otherwise the processing is ended. This constant period is previously set by the operator. The alignment data in the past constant period are employed since excessively old alignment data are unhelpful.

At a step 303, the alignment correction part 6a determines whether or not items of the alignment data (the items include dates, lot numbers, process codes and stepper codes) other than the dates read at a precedent step 301 are identical to those read at the current step 301. The processing advances to a step 304 if the dates are identical to each other, otherwise the processing advances to a step 305. At the step 304, the alignment correction part 6a determines that the wafer itself is abnormal (lot abnormality), and detects the number of continuous times of the same lot number and this lot number. At the step 305, on the other hand, the alignment correction part 6a determines whether or not the process code of the alignment data read at the precedent step 301 is identical to that of the alignment data read at the current step 301. The processing advances to a step 306 if the process codes are identical to each other, otherwise the processing advances to a step 307. At the step 306, the alignment correction part 6a determines that the process is abnormal (process abnormality), and detects the number of continuous times of the same process code and this process code. At the step 307, on the other hand, the alignment correction part 6a determines whether or not the stepper code of the alignment data read at the precedent step 301 is identical to that of the alignment data read at the current step 301. The processing advances to a step 308 if the stepper codes are identical to each other, otherwise the processing advances to a step 309. At the step 308, the alignment correction part 6a determines that a machine mechanism related to alignment of the steppers is abnormal (stepper abnormality), and detects the number of continuous times of the same stepper code and this stepper code. At the step 309, on the other hand, the alignment correction part 6a makes a determination on abnormality of unknown origin, and up counts an abnormal counter for unknown origin.

Figures 7, 8:
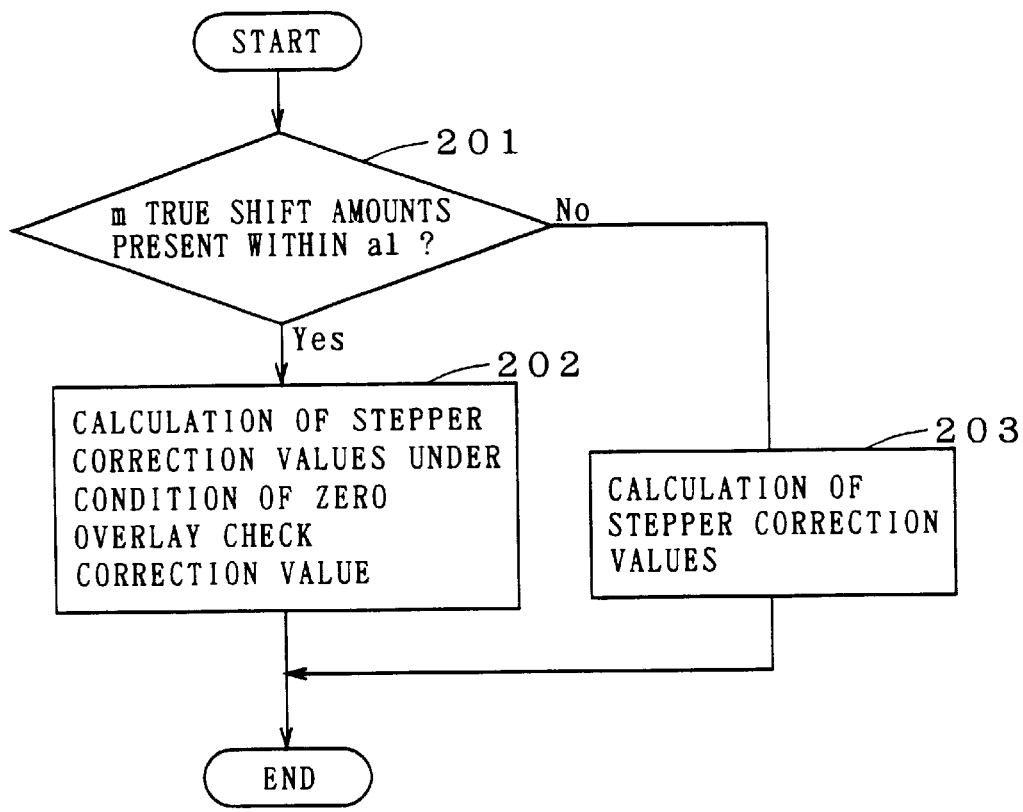
FIG. 7 is a flow chart showing an alignment correction method according to an embodiment 2 of the present invention.
FIG. 8 is a data structural diagram showing parts of alignment data for alignment causing nonstandardization.
Figure 9:
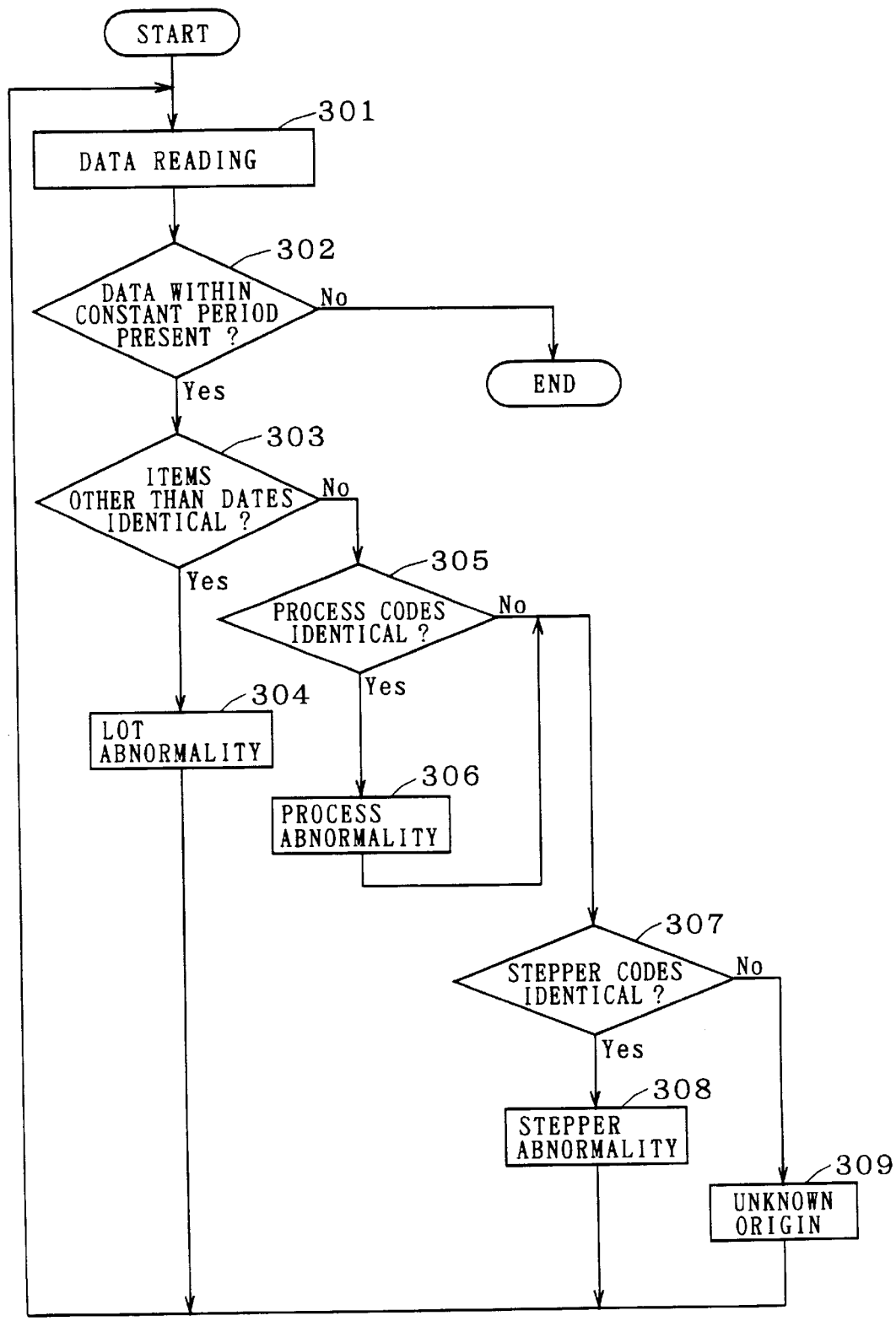
FIG. 9 is a flow chart showing an alignment correction method according to an embodiment 3 of the present invention.
Figures 10, 11:
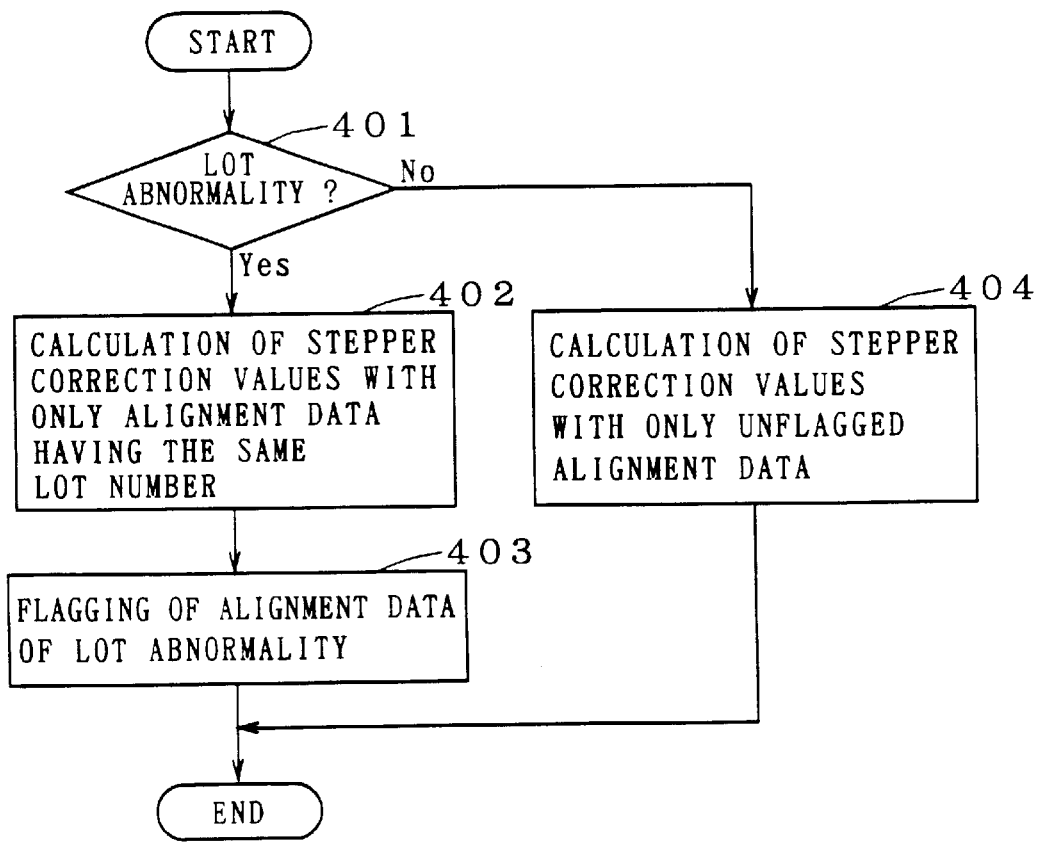
FIG. 10 is an output chart showing detection results obtained by an alignment correction part 6a performing the processing of the flow chart shown in FIG. 9 on the alignment data shown in FIG. 8.
FIG. 11 is a flow chart showing an alignment correction method according to an embodiment 4 of the present invention.

FIG. 10 is a table showing results detected by performing the processing of the flow chart shown in FIG. 9 on the alignment data shown in FIG. 8 by the alignment correction part 6a. This table is displayed on a display (not shown) of the reference terminal 8 shown in FIG. 1, for example. The operator may refer to this table, to check the cause for the above in order of the count numbers.

As hereinabove described, alignment conditions consisting of lot numbers, process codes and stepper codes are stored as shown in FIG. 10, for determining the cause for nonstandardization with the stored alignment conditions. Alternatively, the stored alignment conditions may consist of items other than the above.

An effect of this embodiment is as follows: An operator who tries to detect the cause for nonstandardization must check a number of alignment data stored in the data base 6b, for example, with much labor. According to this embodiment, the alignment correction part 6a automatically detects the cause for nonstandardization in an early stage, to eliminate such labor of the operator.

Embodiment 4

If process abnormality or stepper abnormality is caused in the embodiment 3, the apparatuses or the steppers employed for the processes are checked, to work out a countermeasure for reducing shift amounts, i.e., for improving alignment accuracy. In case of lot abnormality, on the other hand, a countermeasure is worked out for improving alignment accuracy by setting the stepper correction values at proper values.

In case of lot abnormality, for example, the operator may calculate the stepper correction values in place of the alignment correction part 6a, for improving alignment accuracy. If the operator calculates the stepper correction values, however, much labor is required for checking a number of alignment data stored in the data base 6b, actually calculating numerical values, and the like. In an embodiment 4 of the present invention, the alignment correction part 6a carries out these operations in place of the operator.

An alignment correction method according to the embodiment 4 of the present invention performed by the production management system shown in FIG. 1 is described with reference to a flow chart shown in FIG. 11. At a step 401, the alignment correction part 6a determines whether or not lot abnormality is caused. The processing advances to a step 402 if lot abnormality is caused, otherwise the processing advances to a step 404. The embodiment 3 is applied to the determination at the step 401. If the count number of lot abnormality shown in FIG. 10 is larger than a constant value previously set by the operator, for example, the alignment correction part 6a makes a determination on lot abnormality at the step 401. At the step 402, the alignment correction part 6a calculates stepper correction value with only alignment data of the same lot number as that for wafers determined as causing lot abnormality at the step 401. At a step 403, the alignment correction part 6a flags the alignment data having the same lot number as that for the wafers determined as causing lot abnormality at the step 401 among those stored in the data base 6b. At the step 404, on the other hand, the alignment correction part 6a calculates stepper correction value only with unflagged alignment data.

At each of the steps 402 and 404, the stepper correction values are calculated as described above with reference to the embodiment 1.

At the step 401, further, the alignment correction part 6a makes the following determination, in addition to the aforementioned determination: The operator previously stores the lot number of the wafers causing lot abnormality in the data base 6b. The alignment correction part 6a determines whether or not lot abnormality is caused with reference to the lot number stored by the operator.

Effects of this embodiment are as follows: The alignment correction part 6a calculates the stepper correction value if the cause is lot abnormality, whereby the countermeasure can be worked out in an earlier stage than that by the operator. If a determination is made on lot abnormality, the stepper correction value is calculated only with alignment data of the same lot number as that for the wafers determined as causing the lot abnormality, whereby proper correction values are obtained and alignment accuracy is improved. Also when no determination is made on lot abnormality, the stepper correction values are calculated only with unflagged alignment data, whereby proper correction values are obtained. Thus, alignment accuracy is further improved as compared with the embodiments 1 to 3.

Embodiment 5

Figure 12:
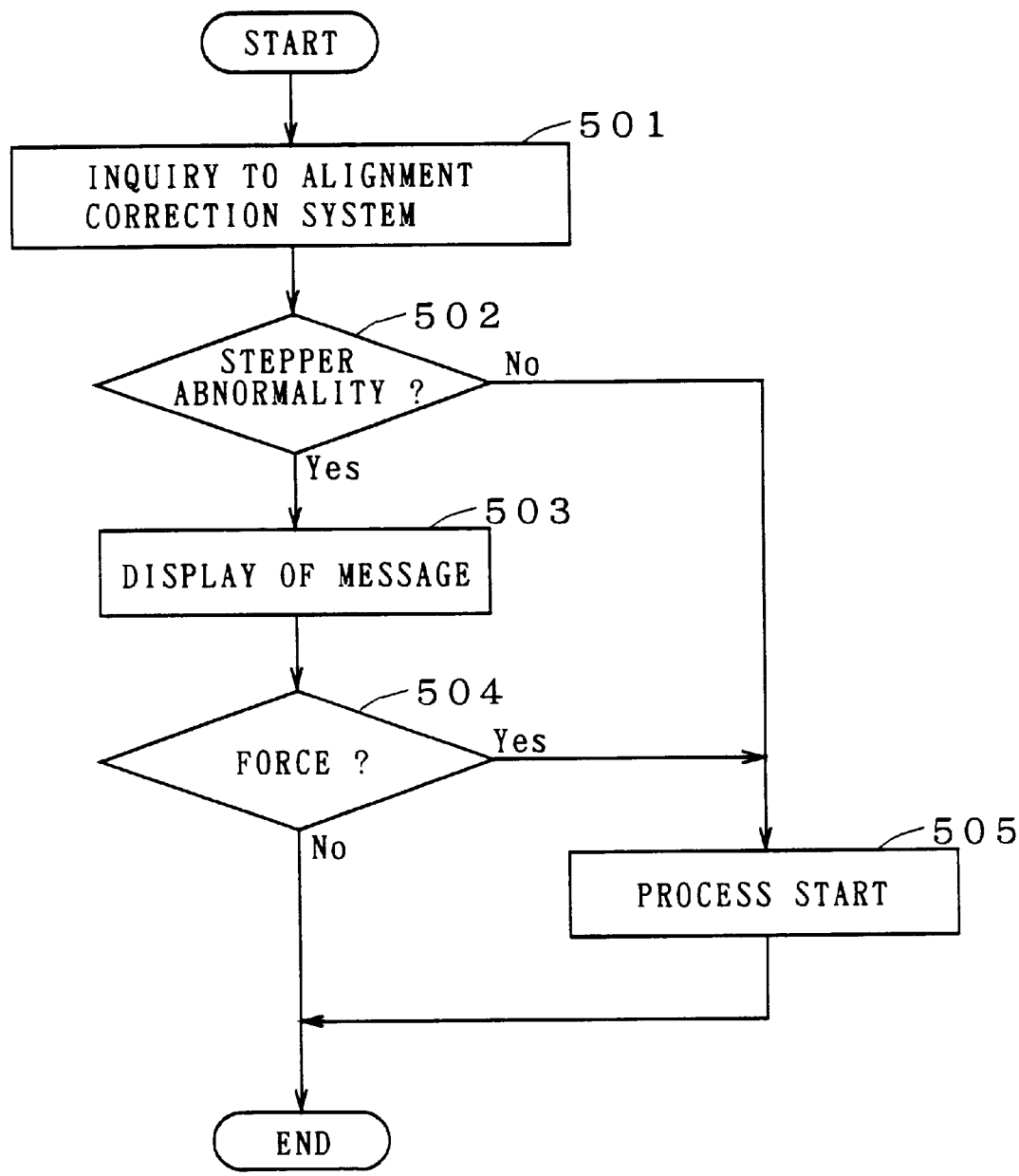
FIG. 12 is a flow chart showing an alignment correction method according to an embodiment 5 of the present invention.

An alignment correction method according to an embodiment 5 of the present invention performed by the production management system shown in FIG. 1 is described with reference to a flow chart shown in FIG. 12. The alignment correction part 6a and the steppers 4a, 4b, . . . can communicate with each other. At a step 501, each stepper employed in next alignment makes inquiries to the alignment correction part 6a as to whether or not the same caused or causes stepper abnormality in the past or at present before starting processes including alignment. At a step 502, the alignment correction part 6a determines whether or not the inquiring stepper caused stepper abnormality in the past. The embodiment 3 is applied to the determination at the step 502. If the count number of stepper abnormality is larger than a constant value previously set by the operator with reference to the table shown in FIG. 10, for example, the alignment correction part 6a makes a determination on stepper abnormality at the step 502. The processing advances to a step 503 if stepper abnormality is caused, otherwise the alignment correction part 6a authorizes the stepper to start the next process, and the processing advances to a step 505.

At the step 503, the alignment correction part 6a outputs information about the abnormality of the stepper. For example, the alignment correction part 6a displays a message "The stepper causes abnormality, and the process start is inhibited." on the display of the reference terminal 8. At a step 504, the operator selects whether or not the next process is forcibly started through the reference terminal 8. If the operator selects forced start of the next process, the message is erased. In response to the selection of the operator for the start of the next process, the alignment correction part 6a authorizes the stepper to start the next process, and the processing advances to the step 505. If the operator selects no forced start of the next process, on the other hand, the processing is ended without starting the next process. At the step 505, the stepper starts the next process only after authorized.

At the step 502, the alignment correction part 6a makes the following determination, in addition to the aforementioned determination: The operator previously stores a stepper code causing stepper abnormality in the data base 6b. The alignment correction part 6a determines whether or not stepper abnormality is caused with reference to the stepper code stored by the operator.

An effect of this embodiment is as follows: If stepper abnormality is caused, the next process is not started, so that occurrence of a large quantity of nonstandard semiconductor devices can be prevented in advance.

Figure 13:
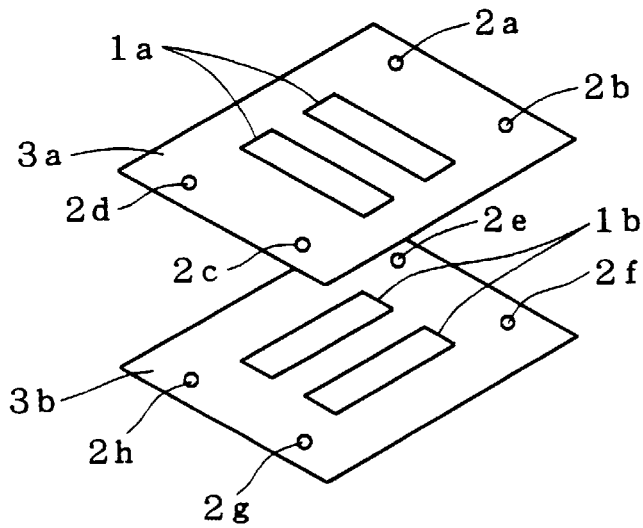
FIG. 13 is a conceptual diagram illustrating alignment.
Figure 14:
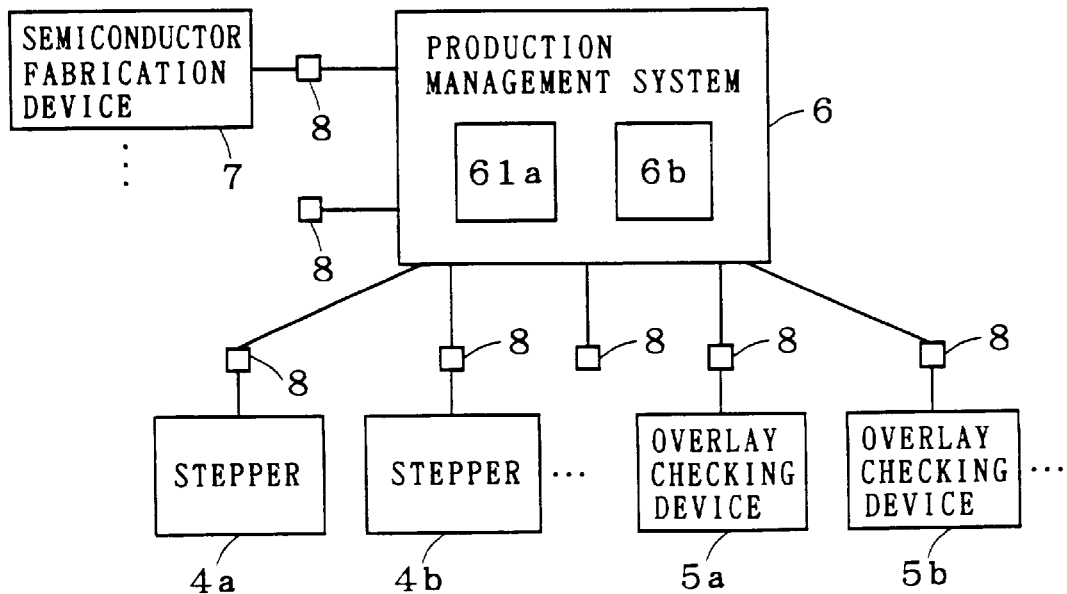
FIG. 14 is a block diagram showing the structure of a conventional production management system.
Figure 1:
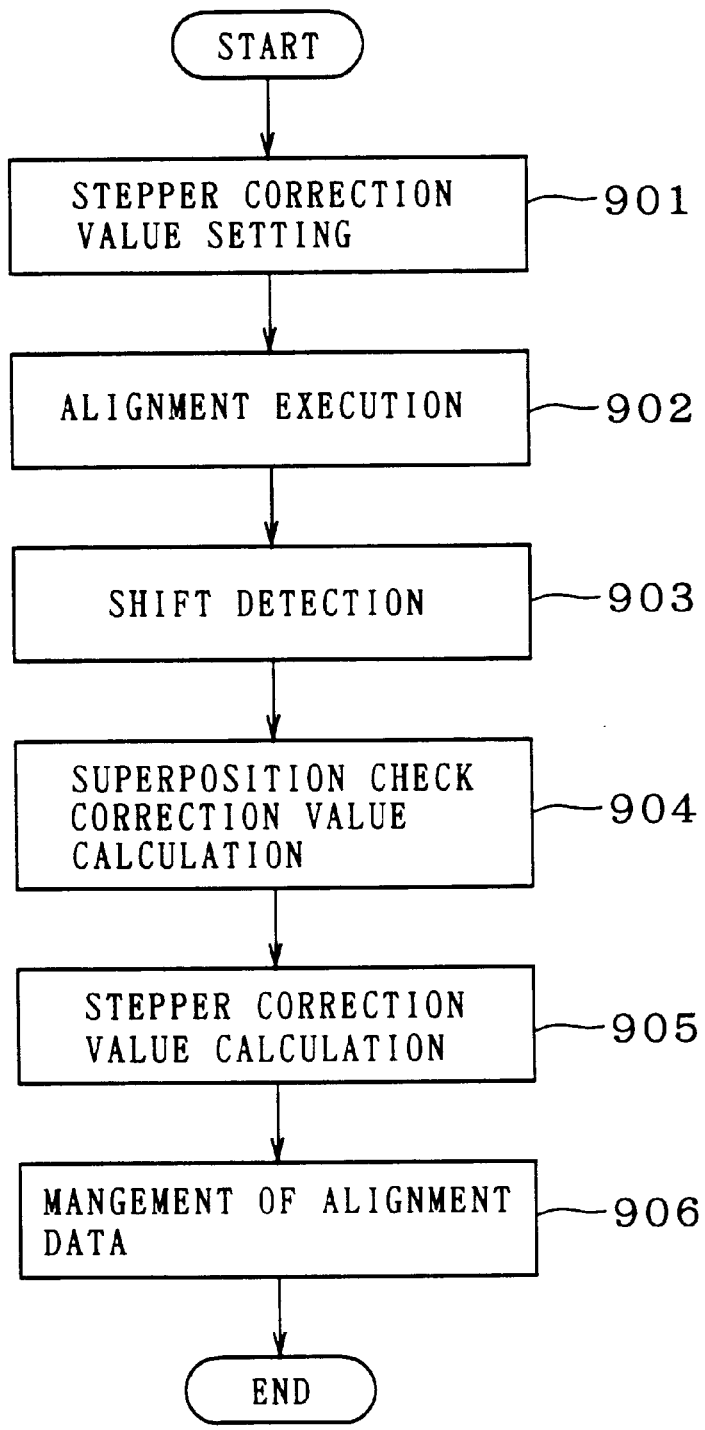
Figure 1:
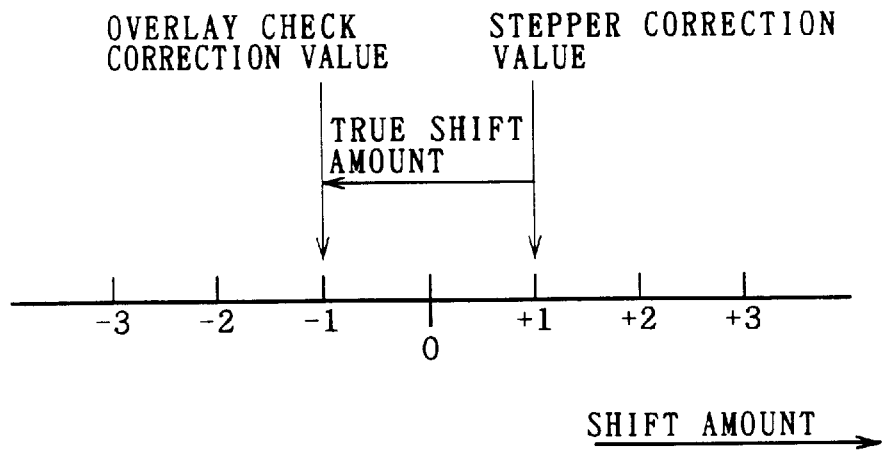
Figure 1:
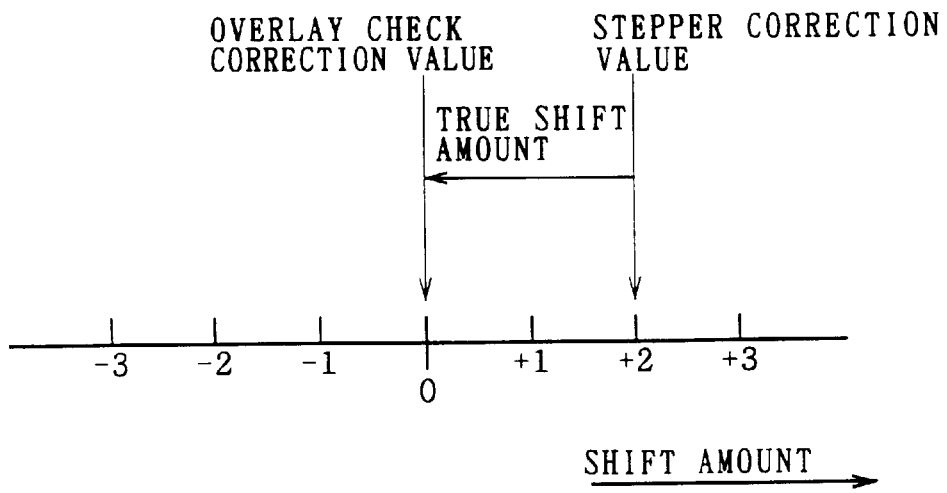
Figure 1:
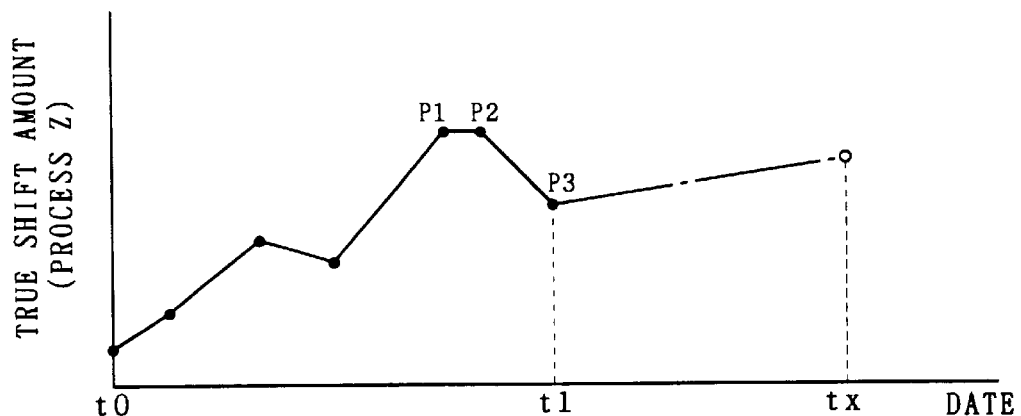
Figure 1:
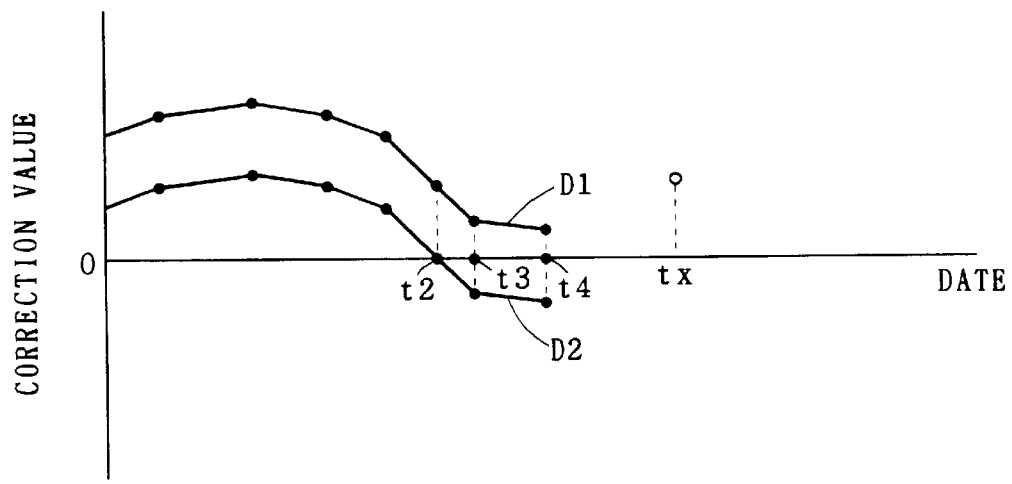

A semiconductor device fabricated through the fabrication line 10 shown in FIG. 1 is as follows: The fabrication line 10 shown in FIG. 1 forms the semiconductor devices 21 having stacked patterns (the patterns 1a and 1b shown in FIG. 13, for example) on the wafer 20. Stepper correction values formed by the alignment correction method described in any of the embodiments 1 to 5 are set in the steppers 4a, 4b, . . . of this fabrication line 10. The stacked patterns provided on the semiconductor devices 21 are higher in alignment accuracy as compared with the prior art, due to the alignment performed by the steppers 4a, 4b, . . . of the fabrication line 10. Thus, the semiconductor devices 21 fabricated through the fabrication line 10 are higher in reliability as compared with the prior art.

Modification

The alignment correction part 6a, which is present in the interior of the production management system body 6 in FIG. 1, may alternatively be present in the exterior of the production management system body 6, to communicate with the same. The correction value (the stepper correction value and the overlay check correction value) may include degrees of X-Y orthogonalization, offsets x and y, scaling values x and y, wafer rotation values, shot magnifications, shot rotation values or the like, in place of the alignment offsets x and y.

While the invention has been shown and described in detail, the foregoing description is in all aspects illustrative and not restrictive. It is therefore understood that numerous modifications and variations can be devised without departing from the scope of the invention.

I claim:

1. An alignment correction method, in a semiconductor device production management system including a plurality of steppers to be set with stepper correction values for eliminating a shift amount between patterns being stacked on a semiconductor device and an overlay checking device for detecting said shift amount between said patterns and forming overlay check correction values for eliminating said detected shift amount, and for forming said stepper correction values being set by said production management system in said steppers, said method including:

(a) a step of storing true shift amounts, being the difference between said stepper correction values and said overlay check correction values, by said production management system every time alignment is performed in said steppers; and (b) a step of forming a stepper correction value, being set in a specific stepper of said steppers in a next alignment, from trends of first true shift amounts related to said specific stepper among said stored true shift amounts, by said production management system, wherein said step (b) includes:

(b-1) a step of obtaining a trend of second true shift amounts related to a process being identical to a process for carrying out said next alignment among said first true shift amounts and predicting a true shift amount in said next alignment from said trend of said second true shift amounts, and (b-2) a step of correcting said predicted true shift amount through third true shift amounts other than said second true shift amounts among said first true shift amounts thereby forming said stepper correction value being set in said specific stepper in said next alignment.

2. The alignment correction method in accordance with claim 2, wherein said step (b-1) includes:

a step of regarding an average value of said trend of said second true shift amounts as a predicted value of a true shift amount in said next alignment, and said step (b-2) includes:

a step of regarding a value being obtained by adding an average value of displacements of said third true shift amounts to said predicted value as said stepper correction value being set in said specific stepper in said next alignment.

3. The alignment correction method in accordance with claim 1, further including:

(c) a step of determining whether or not said trend of said second true shift amounts is substantially constant by said production management system, and (d) a step of forming other said stepper correction value by said production management system on the assumption that said shift amount is not caused if said trend of said second true shift amounts is determined as being substantially constant in said step (c).

4. The alignment correction method in accordance with claim 2, further including:

(c)a step of determining whether or not said second true shift amount is substantially constent by said production management system, and (d) a step of forming other said stepper correction value by said production management ststem on the assumption that said shift amount is not caused if said trend of said second true shift amount is determined as being substantially constant in said step (c).

5. The alignment correction method in accordance with claim 1, further including:

(c) a step of determining whether or not a wafer being processed in said next alignment causes a nonstandard shift amount by said production management system, said step (b) being adapted to form said stepper correction value by employing only a true shift amount of alignment processing for a wafer of the same lot as that of said wafer among said true shift amounts if said wafer is determined as causing said nonstandard shift amount in said step (c).

6. The alignment correction method in accordance with claim 1, further including:

(c) a step of determining whether or not a specific stepper being employed in said next alignment causes a nonstandard shift amount by said production management system, and (d) a step of outputting information that said specific stepper is abnormal when said specific stepper is determined as causing said nonstandard shift amount in said step (c).

7. A semiconductor device production system for producing a semiconductor device having stacked patterns, said stacked patterns being aligned, said system comprising:

a plurality of steppers;

a production management system for setting said steppers with stepper correction values being formed by an alignment correction method, and for eliminating a shift amount between said patterns; and an overlay checking devices for detecting said shift amount between said patterns and forming overlay check correction values for eliminating said detected shift amount;

wherein said production management system stores true shift amounts being the differences between said stepper correction values and said overlay check correction values every time alignment is performed in said steppers;

said production management system forms a stepper correction value, being set in a specific stepper of said steppers in next alignment, from trends of first true shift amounts related to said specific stepper among said stored true shift amounts;

said production management system obtains a trend of second true shift amounts related to a process being identical to a process for carrying out said next alignment among said first true shift amounts and predicting a true shift amount in said next alignment from said trend of said second true shift amounts; and said production management system corrects said predicted true shift amount through third true shift amounts other than said second true shift amounts among said first true shift amounts, thereby forming said stepper correction value being set in said specific stepper in said next alignment.

* * * * *

UNITED STATES PATENT AND TRADEMARK OFFICE
CERTIFICATE OF CORRECTION

PATENT NO. : 6,092,031
DATED : July 18, 2000
INVENTOR(S) : Tsuneo Yasuda

It is certified that error appears in the above-identified patent and that said Letters Patent is hereby corrected as shown below:

Column 14,
Line 11, please change "2" to -- 1 --.
Line 35, please change "2" to -- 1 --.

Column 16,
Line 1, after the word "in", please add the word -- a --.

Claims 8-11,
Please add the following:
    -- 8. A semiconductor fabrication process correction method, in a semiconductor device production management system including a plurality of semiconductor fabrication devices to be set with semiconductor fabrication device correction values for eliminating a shift amount at a predetermined process fabricating a semiconductor device and a checking device for detecting said shift amount and forming check correction values for eliminating said detected shift amount, and for forming said semiconductor fabrication device correction values being set by said production management system in said semiconductor fabrication devices, said method including:
    (a) a step of storing true shift amounts, being the difference between said semiconductor fabrication device correction values and said check correction values, by said production management system every time said semiconductor fabrication process is performed in said semiconductor fabrication devices; and
    (b) a step of forming a semiconductor fabrication device correction value, being set in a specific semiconductor fabrication device of said semiconductor fabrication devices in a next semiconductor fabrication process, from trends of first true shift amounts related to said specific semiconductor fabrication device among said stored true shift amounts, by said production management system,
    wherein said step (b) includes:
    (b-1) a step of obtaining a trend of second true shift amounts related to a process being identical to a process for carrying out said next semiconductor fabrication process among said first true shift amounts and predicting a true shift amount in said next semiconductor fabrication process from said trend of said second true shift amounts, and
    (b-2) a step of correcting said predicted true shift amount through third true shift amounts other than said second true shift amounts among said first true shift amounts, thereby forming said semiconductor fabrication device correction value being set in said specific semiconductor fabrication device in said next semiconductor fabrication process.

UNITED STATES PATENT AND TRADEMARK OFFICE
CERTIFICATE OF CORRECTION

PATENT NO.    : 6,092,031
DATED         : July 18, 2000
INVENTOR(S)   : Tsuneo Yasuda It is certified that error appears in the above-identified patent and that said Letters Patent is hereby corrected as shown below:

9. The semiconductor fabrication process correction method in accordance with claim 8, wherein said step (b-1) includes:
    a step of regarding an average value of said trend of said second true shift amounts as a predicted value of a true shift amount in said next semiconductor fabrication process, and
    said step (b-2) includes:
    a step of regarding a value being obtained by adding an average value of displacements of said third true shift amounts to said predicted value as said semiconductor fabrication device correction value being set in said specific semiconductor fabrication device in said next semiconductor fabrication process.

10. A semiconductor device fabricated by said semiconductor fabrication process correction method in accordance with claim 8.

11. A semiconductor device fabricated by said semiconductor fabrication process correction method in accordance with claim 9. --.

Signed and Sealed this

Thirteenth Day of November, 2001

*Attest:*

*Attesting Officer*

NICHOLAS P. GODICI
*Acting Director of the United States Patent and Trademark Office*